Figure 1:
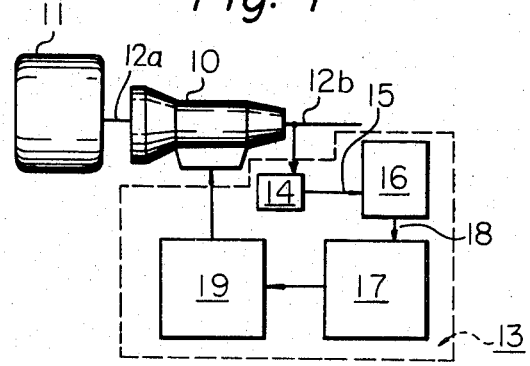

United States Patent [19]
Irie

[11] 3,721,136
[45] March 20, 1973

[54] ELECTRONIC CONTROL DEVICE FOR AUTOMATIC POWER TRANSMISSION MECHANISM

[76] Inventor: Namio Irie, Nissan-nishiterao-ryo, No. 714, Nishiterao, Kanagawa-ku, Yokohama, Japan

[22] Filed: Oct. 13, 1970

[21] Appl. No.: 80,309

[52] U.S. Cl.....................74/856, 74/752 D, 307/290
[51] Int. Cl..........B60k 21/00, F16h 3/74, H03r 3/26
[58] Field of Search ........................74/856; 307/290

[56] References Cited

UNITED STATES PATENTS

| | | | |
|---|---|---|---|
| 3,336,485 | 8/1967 | Scarpa | 307/290 X |
| 3,418,528 | 12/1968 | Watanabe et al. | 307/290 X |
| 3,420,328 | 1/1969 | Johnson et al. | 74/731 X |
| 3,572,168 | 3/1971 | Shirai et al. | 74/752 |
| 3,585,401 | 6/1971 | Karl | 307/290 X |

Primary Examiner—Arthur T. McKeon
Attorney—McCarthy, Depaoli & O'Brien

[57] ABSTRACT

An electronic protection device adapted to prevent a vehicle engine from overrunning when a selector lever is carelessly shifted to lower speed ratios during high speed running. A sensor is provided to electronically detect the vehicle speed for generating a voltage signal corresponding thereto. A comparator circuit is provided to generate in response to the vehicle speed signal a plurality of signals each indicating that a transition to a particular speed ratio associated with the speed signal is possible preventing the vehicle engine from overrunning. A command circuit is provided to respond to the plurality of signals for generating a command signal which is applied to a hydraulic control device. The hydraulic control device is provided to respond to the command signal for controlling the automatic power transmission mechanism to prevent the vehicle engine from overrunning.

1 Claim, 2 Drawing Figures

3,721,136

ELECTRONIC CONTROL DEVICE FOR AUTOMATIC POWER TRANSMISSION MECHANISM

This invention relates to an electronic protection device for an automatic power transmission mechanism of a motor vehicle and more particularly to an electronic protection device that is capable of preventing a vehicle engine from overspeeding when a selector lever is carelessly shifted to lower speed ratios during high speed running.

An ordinary automatic power transmission mechanism has five selector positions, that is, P (parking), R (reverse), N (neutral), D (first, second and third forward speeds) and L (first and second forward speeds) or has six selector positions, that is, P, R, N, D, II (second forward speed locked) and I (first and second forward speeds). In the automatic power transmission mechanism of these types, selection of speed ratios is hydraulically effected in response to movement of a selector lever by a vehicle operator, and it is possible that during high speed running he carelessly shifts the selector lever to a lower speed ratio, for example, to II or I position. As this occurs, the vehicle engine tends to overspeed and apply an excessive engine braking effect to the running vehicle, causing a serious damage to the automatic power transmission mechanism.

It is, therefore, an object of this invention to provide an electronic protection device that prevents overspeeding of the vehicle engine and protects the automatic power transmission mechanism against damage.

It is another object of the invention to provide an electronic protection device that detects electronically the vehicle speed and effects an up-shift of the transmission mechanism when the vehicle speed exceeds a predetermined upper limit of the particular speed ratio in which overspeeding of the engine does not take place.

Figure 2:
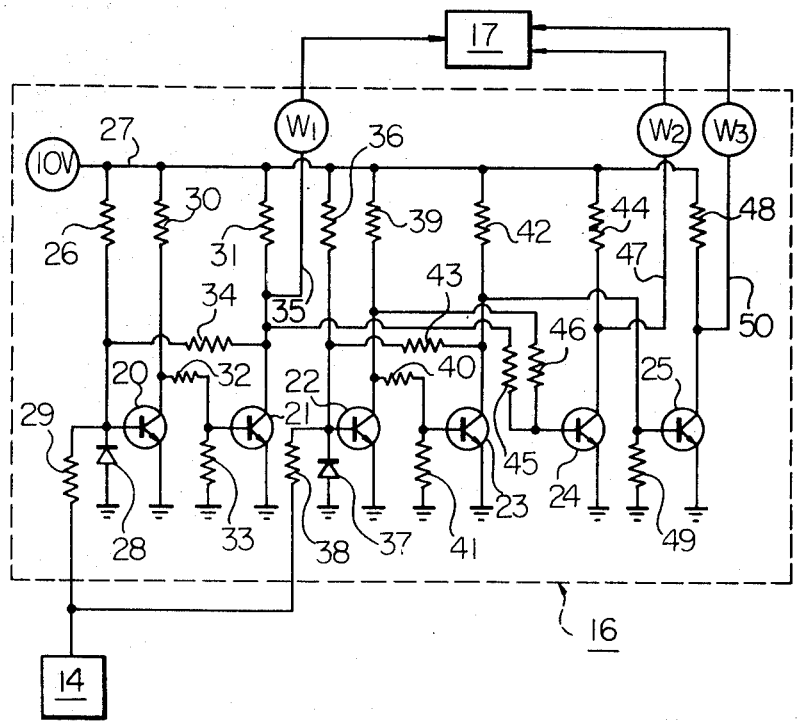

In the drawings:

FIG. 1 shows diagrammatically an electronic protection device for an automatic power transmission mechanism constructed in accordance with an embodiment of this invention; and FIG. 2 shows a wiring diagram of a comparator circuit of the electronic protection device shown in FIG. 1.

Referring now to FIG. 1, there is shown an engine protector unit according to the present invention, which engine protector unit is specifically suited for use in an automatic power transmission. The automatic power transmission which is generally indicated at 10 is of the type which is clearly shown and described in U.S. Pat. No. 3,640,156 entitled "CONTROL SYSTEM FOR AUTOMATIC POWER TRANSMISSION". The automatic power transmission 10 usually includes a drive shaft 12a which is drivably connected to and driven by an engine 11 and a driven shaft 12b.

The electronic protection device generally indicated at 13 includes a vehicle speed sensor 14 which is operatively connected to the driven shaft 12b of the power transmission 10 to sense vehicle speed and to generate a variable negative voltage signal in proportion to the vehicle speed. The vehicle speed sensor 14 may be of any known construction insofar as it functions to generate the variable negative voltage signal which negatively increases as the vehicle speed increases and is, for example, shown and described in U.S. Pat. Nos. 3,433,101 or 3,448,640. The output voltage signal carrying information as to the vehicle speed is applied through a line 15 to a comparator circuit 16. The comparator circuit 16 includes a plurality of Schmidt circuits and operates to compare the voltage signal of the vehicle speed with the predetermined voltage levels corresponding to the upper limit of speed levels, at which an up-shift is to be effected in the automatic transmission mechanism 10. When the vehicle speed exceeds the predetermined upper limit, the comparator circuit 16 applies a plurality of electric signals to a command circuit 17 through a line 18. The command circuit 17 may be of any known construction insofar as it functions to generate a plurality of gear ratio command signals in response to the electric signals from the comparator circuit 16. For example, this command circuit 17 is clearly shown and described as a solenoid control unit in a copending U.S. Pat. application Ser. No. 80,311 entitled "A CONTROL SYSTEM FOR AN AUTOMOTIVE AUTOMATIC POWER TRANSMISSION" and, therefore, the detail description of the same is herein omitted for the sake of illustration. In response to this signal, the command circuit 17 controls a hydraulic control device 19 in response to command signals so as to cause gear reduction in the transmission mechanism 10 to have a proper gear ratio, thereby preventing the engine 11 from overspeeding, or from operating at an extraordinarily high speed. The hydraulic control device 19 may be of a conventional type insofar as it functions to automatically maintain the automatic power transmission in its proper gear ratio in response to the command signals and is, for example, shown and described in detail in the copending U.S. patent application as mentioned hereinabove, and, therefore, the detail description of the same is herein omitted for the sake of simplicity of illustration.

FIG. 2 shows a wiring diagram of the comparator circuit 16 of the present electronic protection device. This comparator circuit 16 is composed, by way of example, of six transistors 20 to 25 and their associated electronic parts. The transistor 20 is connected at its base to a resistor 26, which in turn is connected to a bus line 27 of a predetermined positive voltage, for example, 10 volts. The base of the transistor 20 is grounded by way of a diode 28 which is polarized so that a negative potential is not established at the base of the transistor 20. The base of the transistor 20 is connected by way of a resistor 29 to the output of the sensor 14. The collector of the transistor 20 is connected to the bus line 27 by way of a resistor 30. The emitter of the transistor 20 is connected directly to ground.

The transistor 21 is connected at its collector to a resistor 31 which in turn is connected to the bus line 27. The base of the transistor 21 is connected via a resistor 32 to the collector of the transistor 20 and via a resistor 33 to ground. The emitter of the transistor 21 is connected directly to ground. A resistor 34 is connected between the base of the transistor 20 and the collector of the transistor 21. Connected at a point on the line between the collector of the transistor 21 and the resistor 31 is a line 35, through which a signal indicating that a transition to the first speed gear ratio is possible without causing the engine to overspeed is applied to the command circuit 17.

The transistor 22 is connected at its base to the bus line 27 by way of a resistor 36. The base of the transistor 22 is grounded by way of a diode 37 which is polarized so that a negative potential is not established on the base. The base of the transistor 22 is also connected to the sensor 14 by way of a resistor 38. The collector of the transistor 22 is connected to the bus line 27 by way of a resistor 39. The emitter of the transistor 22 is also connected directly to ground.

The transistor 23 is connected at its base to the collector of the transistor 22 by way of a resistor 40. The base of the transistor 23 is connected to ground by a resistor 41. The collector of the transistor 23 is connected to the bus line 27 by way of a resistor 42 and to the base of the transistor 22 by way of resistor 43. The emitter of the transistor 23 is directly grounded.

The transistor 24 is connected at its collector to the bus line 27 by way of a resistor 44 and at its emitter directly to ground. The base of the transistor 24 is connected to the collector of the transistor 21 by way of a resistor 45 and to the collector of the transistor 22 by way of a resistor 46. Connected at a point on the line between the collector of the transistor 24 and the resistor 44 is a line 47, through which a signal indicating that an up-shift to the second speed ratio is possible without causing the engine to overspeed is applied to the command circuit 17.

The transistor 25 is connected at its collector to the bus line 27 by way of a resistor 48. The base of the transistor 25 is connected to ground by way of a resistor 49 and directly to the collector of the transistor 23. The emitter of the transistor 25 is connected directly to ground. A line 50 is connected to the collector of the transistor 25 to derive therefrom a signal indicating that an up-shift to the third speed ratio is possible, which signal is to be applied to the command circuit 17.

During first speed forward drive of the vehicle, a first electric signal $W_1$ is established on the line 35. More specifically, when the vehicle runs at a first speed, the sensor 14 has a low negative voltage output, which in turn is applied to the base of the transistor 20. A predetermined positive voltage is also applied to the base of the transistor 20 by way of the resistor 26. As the output of the sensor 14 is much lower in magnitude than the positive voltage, the potential at the base of the transistor 20 exceeds a predetermined upper-limit level, thereby rendering the transistor 20 conductive. Thus, the collector of the transistor 20 is at zero potential and hence the transistor 21 is rendered nonconductive because of the fact that the base thereof is connected to the collector of the transistor 20. This invites a first electric signal $W_1$ on the line 35, which signal indicates that the automatic power transmission should be maintained in its first speed gear ratio to prevent the engine from overspeeding.

It is to be noted here that the resistors 26 and 29 should be adjusted to have such relative resistance values that the transistor 20 turns nonconductive when the vehicle speed exceeds a predetermined level at which a transition from the first to second speed ratio takes place. Therefore, when the vehicle speed exceeds the predetermined level, the transistor 20 is rendered non-conductive, causing the transistor 21 to turn conductive, so that the first electric signal $W_1$ on the line 35 disappears.

The resistors 36 and 38 are adjusted so that the transistor 22 cannot be rendered nonconductive until the vehicle speed exceeds a predetermined level at which a transition from the second to third speed ratio takes place. Thus, during the first and second speed forward drive, the transistor 23 having its base connected to the collector of the transistor 22 remains nonconductive. Therefore, the transistor 25 having its base connected to the collector of the transistor 23 is rendered conductive. In this instance, a third electric signal $W_3$ does not appear on the line 50. As described above, when the vehicle speed exceeds the level at which a transition from the first to second speed ratio takes place, the transistor 20 is rendered nonconductive, thereby causing the transistor 21 to become conductive. This will drop the potential at the base of the transistor 24 which is connected to the collector of the transistor 21 by way of the resistor 45, so that the transistor 24 is rendered nonconductive. When the transistor 24 turns nonconductive, then a second electric signal $W_2$ appears on the line 47, indicating that the power transmission should be maintained in its second speed gear ratio to prevent the engine from overspeeding.

As already described above, when the vehicle speed exceeds a predetermined level at which a transition from the second to third speed ratio takes place, the transistor 22 is rendered nonconductive, causing the base potential of the transistor 24 to increase. This will cause the transistor 24 to become conductive, so that the second electric signal signal $W_2$ on the line 47 disappears. Then, the transistor 23 having its base connected to the collector of the transistor 22 by way of the resistor 40 is rendered conductive, thus causing the transistor 25 having its base connected to the collector of the transistor 23 to become nonconductive. This will produce the third electric signal $W_3$ on the line 50. The operations of the six transistors 20 to 25 during the first, second and third speed ratios are shown in the following table.

| | SPEED RATIO | | |
|---|---|---|---|
| | 1st | 2nd | 3rd |
| Transistor 20 | conductive | nonconductive | nonconductive |
| Transistor 21 | nonconductive | conductive | conductive |
| | → $W_1$ | | |
| Transistor 22 | conductive | conductive | nonconductive |
| Transistor 23 | nonconductive | nonconductive | conductive |
| Transistor 24 | conductive | nonconductive | conductive |
| | | → $W_2$ | |
| Transistor 25 | conductive | conductive | nonconductive |
| | | | → $W_3$ |

As shown in the table, the electric signals $W_1$, $W_2$ and $W_3$ are generated on the lines 35, 47 and 50, respectively, when the vehicle speed is in the first, second and third speed ranges, respectively. These signals $W_1$, $W_2$ and $W_3$ are applied to the command circuit 17 which generates a command signal to be applied to the hydraulic control device 19. The hydraulic control device 19 in turn controls the automatic power transmission mechanism 10 to prevent the vehicle engine from overspeeding.

Now, assuming that the selector lever is carelessly shifted from "D" to "2" position when the vehicle is running at a high speed, the signal $W_3$ is applied to the command circuit 17 and the signals as $W_1$ and $W_2$ are zero. In the comparator circuit 16, there is only one signal $W_3$, indicating that an up-shift only to the third speed is possible. Thus, an up-shift to the third speed takes place in the automatic power transmission without causing the vehicle engine to overspeed, thereby preventing application of an excessive engine braking effect.

What is claimed is:

1. In an automatic power transmission for a motor vehicle driven by an engine wherein said automatic power transmission has a driven shaft, the improvement of an electronic protection device comprising a vehicle speed sensor connected to said driven shaft of said automatic power transmission to sense vehicle speed and to generate a negative voltage signal which negatively increases in its magnitude as the vehicle speed increases; a comparator circuit electrically connected to said vehicle speed sensor for comparing said negative voltage signal with predetermined positive voltage levels for thereby selectively generating three different electric signals when said negative voltage signal exceeds said predetermined positive voltage levels; a command circuit electrically connected to said comparator circuit and responsive to said electric signals for generating first, second and third speed gear ratio command signals, and a hydraulic control device electrically connected to said command circuit and responsive to said first, second and third speed gear ratio command signals for automatically controlling said automatic power transmission; said comparator circuit including a bus line of a predetermined positive voltage, a first transistor connected at its base to said bus line and said vehicle speed sensor to receive said predetermined positive voltage and said negative voltage; a first resistor connected between the base of said first transistor and said bus line; a second resistor connected between the base of said first transistor and said vehicle speed sensor, the resistance values of said first and second resistors being adjusted within a first range to render said first transistor conductive when the vehicle speed is below a first predetermined level; a second transistor connected at its base to the collector of said first transistor and connected at its collector to said bus line, said second transistor being further connected at its collector to said command circuit through a line on which said electric signal appears, said first transistor being conductive when the potential at the base of said first transistor exceeds a predetermined upperlimit level thereby rendering said second transistor non-conductive to generate said first electric signal at the collector thereof; a third transistor connected at its base to said bus line and said vehicle speed sensor, a fourth resistor connected between the base of said third transistor and said bus line, the resistance values of said third and fourth resistors being adjusted within a second range to render said third transistor conductive when vehicle speed is in a range between the first predetermined level and a second predetermined level; a fourth transistor connected at its base to the collector of said second transistor and the collector of said third transistor, said fourth transistor being also connected at its collector to said command circuit through a second line at which said second electric signal appears, said fourth transistor being nonconductive when said third transistor is conductive for thereby generating said second electric signal at the collector thereof; a fifth transistor connected at its collector to said bus line, and a sixth transistor connected at its base to the collector of said fifth transistor, said sixth transistor being also connected at its collector to said bus line and said command circuit through a third line on which said third electric signal appears, said fifth transistor being rendered conductive when the vehicle speed exceeds the second predetermined level to cause said third transistor to become nonconductive thereby to render said sixth transistor nonconductive for thereby generating said third electric signal at the collector thereof.

* * * * *